United States Patent
Scheffler et al.

(10) Patent No.: US 9,802,561 B2
(45) Date of Patent: Oct. 31, 2017

(54) AIRCRAFT POWER MANAGEMENT SYSTEM AND METHOD FOR MANAGING POWER SUPPLY IN AN AIRCRAFT

(71) Applicant: Airbus Operations GmbH, Hamburg (DE)

(72) Inventors: Sebastian Scheffler, Hamburg (DE); Frank Leuenberger, Hamburg (DE)

(73) Assignee: Airbus Operations GmbH (DE)

( * ) Notice: Subject to any disclaimer, the term of this patent is extended or adjusted under 35 U.S.C. 154(b) by 407 days.

(21) Appl. No.: 14/552,609

(22) Filed: Nov. 25, 2014

(65) Prior Publication Data
US 2015/0145326 A1 May 28, 2015

(30) Foreign Application Priority Data
Nov. 28, 2013 (EP) .................................. 13194909

(51) Int. Cl.
*H02J 1/14* (2006.01)
*H02J 3/14* (2006.01)
(Continued)

(52) U.S. Cl.
CPC ................ *B60R 16/03* (2013.01); *G05F 1/66* (2013.01); *H02J 1/14* (2013.01); *H02J 3/14* (2013.01); *B64D 2221/00* (2013.01); *H02J 4/00* (2013.01)

(58) Field of Classification Search
CPC ....... B64D 2221/00; B64D 11/00; G05F 1/66; B60R 16/03; H02J 1/14; H02J 3/14; H02J 4/00
See application file for complete search history.

(56) References Cited

U.S. PATENT DOCUMENTS 5,583,419 A 12/1996 Haller
5,936,318 A 8/1999 Weiler et al.
(Continued)

FOREIGN PATENT DOCUMENTS

DE 195 02 786 C2 2/1997
DE 196 17 915 A1 11/1997
(Continued)

OTHER PUBLICATIONS

Search Report dated May 12, 2014 (EP 13194909.1).
Search Report EP 13194913.3 dated May 12, 2014.

*Primary Examiner* — Ryan Johnson
(74) *Attorney, Agent, or Firm* — Lerner, David, Littenberg, Krumholz & Mentlik, LLP

(57) ABSTRACT

A power management system includes an electrical power supply input configured to be coupled to an electrical power supply, a first power supply bus bar coupled to the power supply input, a power management device coupled to the first power supply bus bar, at least one primary electrical equipment including a primary load being coupled in parallel to the power management device, and at least one secondary electrical equipment including a secondary load being coupled in parallel to the power management device. The power manager device is configured to supply electrical power to the at least one secondary electrical equipment, to supply electrical power to the at least one primary electrical equipment, and to deactivate the power supply to the at least one secondary electrical equipment, as long as the at least one primary electrical equipment is supplied with electrical power.

11 Claims, 1 Drawing Sheet

(51) Int. Cl.
 *G05F 1/66* (2006.01)
 *B60R 16/03* (2006.01)
 *H02J 4/00* (2006.01)

(56) References Cited

U.S. PATENT DOCUMENTS

| | | | |
|---|---|---|---|
| 6,921,987 B2 * | 7/2005 | Marin-Martinod | B64D 11/0015 307/29 |
| 7,098,555 B2 | 8/2006 | Glahn et al. | |
| 8,935,011 B2 * | 1/2015 | Tischer | H02J 3/14 700/286 |
| 2007/0241614 A1 | 10/2007 | Busdiecker et al. | |
| 2007/0296273 A1 | 12/2007 | Reitmann et al. | |
| 2008/0027592 A1 | 1/2008 | Fernandez-Ramos | |
| 2009/0152942 A1 | 6/2009 | Waite et al. | |
| 2010/0270858 A1 | 10/2010 | Foch et al. | |
| 2011/0291411 A1 | 12/2011 | Folken | |
| 2012/0228426 A1 | 9/2012 | Schneider et al. | |
| 2013/0009465 A1 | 1/2013 | Bajjuri et al. | |
| 2013/0158750 A1 | 6/2013 | Bosson et al. | |
| 2014/0240902 A1 | 8/2014 | Burch | |
| 2015/0045976 A1 * | 2/2015 | Li | H02J 4/00 700/295 |
| 2015/0045978 A1 * | 2/2015 | Yoshiguchi | H02J 3/14 700/295 |

FOREIGN PATENT DOCUMENTS

| | | |
|---|---|---|
| DE | 10 2006 028823 A1 | 1/2008 |
| EP | 1 387 460 A2 | 2/2004 |
| EP | 2 166 636 A2 | 3/2010 |
| EP | 2 579 412 A1 | 4/2013 |
| WO | 2011/081943 A2 | 7/2011 |
| WO | 2013109169 A2 | 7/2013 |

\* cited by examiner

AIRCRAFT POWER MANAGEMENT SYSTEM AND METHOD FOR MANAGING POWER SUPPLY IN AN AIRCRAFT

FIELD OF THE INVENTION

The present invention pertains to an aircraft power management system and a method for managing power supply in an aircraft.

BACKGROUND OF THE INVENTION

In airborne vehicles there is a high demand for electrical power which is distributed among a multitude of different electrically operated aircraft components. Demand for electrical power is highly volatile depending on system dynamics, human behaviour and vehicle operation state. Considering the constraints in system weight, required implementation space and wiring requirements, it is a complex task to fulfill all electrical power needs while keeping the power generation and distribution system in operation without exceeding the capabilities of the system at any point in time during operation of the airborne vehicle.

If a fault occurs in the power generation system, the maximum acceptable load may be reduced in order to avoid an overload, for example by shedding specific loads or electrical bus bars. Such shedding procedures are usually globally applied, and all components or equipments being serviced with the same shed bus bar are switched off while different approaches may be used to keep the noticeable effect on the shed loads as small as possible. One approach may be to shed a minimum number of components or equipments to avoid an overload of the power generation system.

In typical aircraft system designs, the electrical power generation system is furthermore designed to provide the sum of the maxima of all connected equipments. As long as not being precluded by the operational state of the vehicle, electrical loads from equipments may occur at any time and independently from load requirements of other equipments. This allows for many electrical equipments to be activated at the same time, even if there is no specific use case tied to that situation. For example, the operational state of a vehicle such as an aircraft precludes the activation of the cargo loading system during flight. But if an electrical equipment is activated by a human such as a passenger of the aircraft, the operational state of the aircraft is an insufficient parameter to predict the activation of such an equipment.

The document EP 1 387 460 A1 discloses a power supply arrangement for the galley of an airborne vehicle which utilizes control command provided by a control unit that manages the power consumption of galley equipment depending on individual operating conditions of the equipment.

The document DE 195 02 786 C2 discloses a method for protecting an electrical network from overload by inhibiting the activation of electrical equipment which would else cause an overload.

The document US 2008/0027592 A1 discloses an avionic system and architecture with integrated power management that assigns electrical loads to distribution nodes according to their criticality level for the safety of the aircraft.

BRIEF SUMMARY OF THE INVENTION

It is one idea of the invention to provide solutions for power management in an aircraft that keeps the total amount of consumed electrical power as low as possible and that reduces the efforts needed to distribute the electrical power among aircraft equipment and components.

According to a first aspect of the invention, an aircraft power management system comprises an electrical power supply input configured to be coupled to an electrical power supply, a first power supply bus bar coupled to the power supply input, a power management device coupled to the first power supply bus bar, at least one primary electrical equipment including a primary load being coupled in parallel to the power management device, and at least one secondary electrical equipment including a secondary load being coupled in parallel to the power management device, wherein the power manager device is configured to supply electrical power to the at least one secondary electrical equipment, to supply electrical power to the at least one primary electrical equipment, and to deactivate the power supply to the at least one secondary electrical equipment, as long as the at least one primary electrical equipment is supplied with electrical power.

According to a second aspect of the invention, a method for managing power supply in an aircraft having a power management system according to the first aspect comprises operating the secondary load of the at least one secondary electrical equipment, monitoring the power demand of the primary load of the at least one primary electrical equipment, and deactivating the at least one secondary electrical equipment, as long as the power demand of the primary load of the at least one primary electrical equipment exceeds a primary threshold.

According to further aspects of the invention, a lavatory and an aircraft seat of an aircraft comprise a power management system according to an embodiment of the invention.

One idea of the present invention is to localize power management function in assemblies of associated electrical components that include components which may at least be temporarily deactivated without either significant degradation in performance or impact on aircraft safety. For effectively using electrical power by local power management, the aircraft operational state and the system dynamics are subject to the principles of mutually exclusive activation. The main concept involves exploiting the knowledge that simultaneous activation of at least two loads is either impossible to happen, i.e. natural mutually exclusive activation, or can be prohibited by the power management without significant loss in performance of the two loads, i.e. forced mutually exclusive activation.

According to an embodiment of the power management system, the power management system may further comprise a second power supply bus bar coupled in parallel to the first power supply bus bar to the power supply input, and at least one tertiary electrical equipment including a tertiary load coupled in parallel to the second power supply bus bar.

According to another embodiment of the power management system, the power management device may further be configured to apply a switching delay, before deactivating the power supply to the at least one secondary electrical equipment and supplying the at least one primary electrical equipment with electrical power. This allows for the secondary electrical equipments to be brought into an initial predefined state which might not be interpreted by a user as malfunction or reduction of comfort.

According to yet another embodiment of the power management system the at least one secondary electrical equipment may be configured to return a status signal with respect to its operational state to the power management device, and wherein the power management device is configured to set the duration of the switching delay according to the returned status signal. In that manner, various secondary electrical equipments may report their status and the power management device may flexibly assign intervals needed for the secondary electrical equipments to return to their initial predefined states safely.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1:
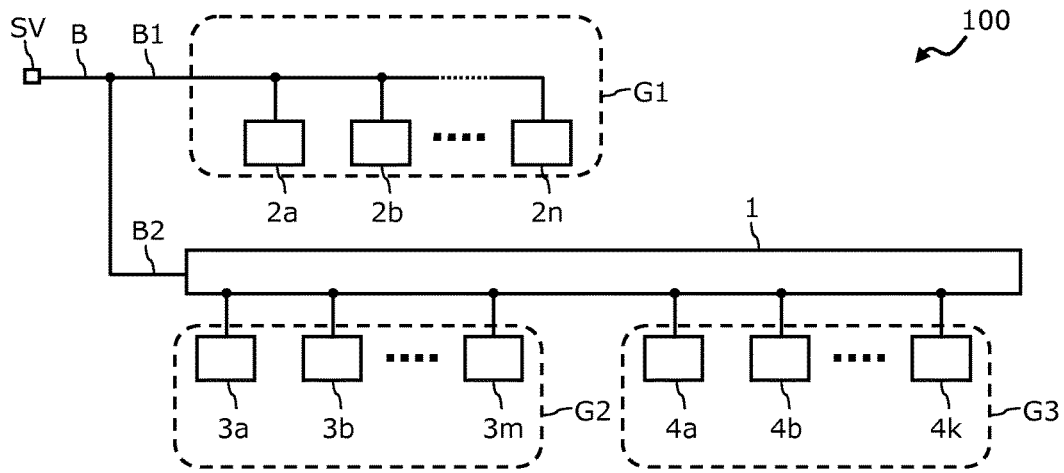
FIG. 1 schematically illustrates a power management architecture in an aircraft according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Electrical power management in complex architectures and systems having a multitude of different electrical components, such as in aircraft or airborne vehicles in general, is subject to certain safety-relevant constraints that have to be taken into account when designing the system. On the other hand, the innate functions of electrical components themselves are tied with a certain criticality level—the higher the criticality of the function of the component for the safety of the aircraft, the more stringent and accurate the development process for that component will be. In turn, the more stringent the development processes of a component, the higher the costs of development and manufacturing.

If there are no components in a power management architecture that have a criticality high enough to warrant specific integration of a power management function within the component, it is desirable to shift the responsibility of power management functions to a local environment in which components are controlled depending on their specific function and its impact on the overall system performance.

By employing such an approach of selective local power management it is possible to group equipments according to their mutually exclusive activation schemes as explained above in the summary section. Advantageously, the implementation of the system comes along with reduced total electrical power demand of all components and therefore reduced power demand for the power generation system. Furthermore, the amount and size of electrical power supplies in the system may be reduced, which in turn leads to less system weight and implementation costs.

Power management systems within the meaning of the present application may include any group or installation of multiple different electrical equipments being supplied with power from a common power supply bus. For example, power management systems within the meaning of the present application may advantageously be employed in space limited environments, especially in airborne vehicles, for example in connection with hatracks, lavatories or aircraft seats. Power management systems within the meaning of the present application may comprise, for example, lavatories, hatracks, aircraft seats, aircraft galleys, door actuation systems, cargo load bays and similar systems within an aircraft and/or the passenger cabin of an aircraft.

DETAILED DESCRIPTION

FIG. 1 schematically shows an illustration of an exemplary power management system 100 within an aircraft or airborne vehicle. The power management system 100 comprises an electrical power supply input SV which is configured to be coupled to an electrical power supply. The electrical power supply may in particular be adapted to the supply demand of the equipments in the power management system 100, i.e. in supply voltage level and supply voltage type (AC or DC).

The power supply input SV feeds a main power supply bus bar B which is turn is coupled to a first power supply bus bar B1. The first power supply bus bar B1 is configured to support the power supply for a first group G1 of equipments or electrical devices, generally denoted with reference signs 2a, 2b, 2n. The electrical equipments 2a, 2b, 2n may be equipments to be supplied with electrical power independently of power management requirements, i.e. they shall not be subject to power management at all. Thus, each of the electrical equipments 2a, 2b, 2n may be coupled in parallel to the first power supply bus bar B1. The electrical equipments 2a, 2b, 2n of the first equipment group G1 are hereinforth denoted as tertiary electrical equipments, without loss of generality. Each of the electrical equipments 2a, 2b, 2n may comprise a respective tertiary load, depending on the function of the equipment.

Coupled in parallel to the first power supply bus bar B1, a second power supply bus bar B2 feeds a local power management device 1, which in turn in configured to control supply of electrical power from the second power supply bus bar B2 to electrical equipments 3a to 3m and 4a to 4k, respectively.

A second group G2 of electrical equipments 3a to 3m may be coupled to the power management device 1, with the electrical equipments 3a to 3m being electrical equipments the degradation in performance of which is considered to be below an acceptable limit, i.e. the deactivation of which for a certain period of time is considered to have a negligible impact on the overall system performance and the system safety. The electrical equipments 3a to 3m are hereinforth denoted as secondary electrical equipments, without loss of generality.

On the other hand, the electrical equipments 4a to 4k in a third group G3 of equipments may be coupled in parallel to the power management device 1 as well, but may be electrical equipments which are under normal circumstances just temporarily activated and require full performance. The electrical equipments 4a to 4k are hereinforth denoted as primary electrical equipments, without loss of generality.

The number of each of the electrical equipments in each of the groups G1, G2 and G3 is exemplarily shown as three, however, any other number n, m and k, respectively, may be possible for the electrical equipments in the groups G1, G2 and G3 as well. Particularly, the numbers n, m and k may vary between each other, depending on the specific requirements in the local power management system 100 of FIG. 1.

With the power management system 100, overall power demand may be reduced, when one or more of the secondary electrical equipments 3a to 3m are deactivated while one or more of the primary electrical equipments 4a to 4k are active. Thus, the power manager device 1 is configured to deactivate the power supply to the secondary electrical equipment(s) 3a to 3m, as long as the at least one primary electrical equipment(s) 4a to 4k is supplied with electrical power.

The deactivation of secondary electrical equipment(s) 3a to 3m may require a short switching delay to allow the deactivated secondary electrical equipment(s) 3a to 3m to return to some initial state, i.e. an operational state that may properly qualify as idle mode. This may be particularly useful, when the secondary electrical equipment(s) 3a to 3m employ mechanical movement in space. Unusual cease of movement outside the initial or idle state may possibly misinterpreted by a user as failure or be perceived as detrimental to the comfort. In this case the power management device 1 may be further configured to apply a switching delay, before deactivating the power supply to the secondary electrical equipment(s) 3a to 3m and supplying the primary electrical equipment(s) 4a to 4k with electrical power.

This may be done by implementing some basic or simplified control mechanisms to ensure return in the initial state where appropriate. To that end, the secondary electrical equipments 3a to 3 may be configured to return one or more status signals with respect to their operational state to the power management device 1, so that the power management device 1 may set the duration of the switching delay according to the returned status signal.

The introduction of a local power management device provides the advantage that the development and implementation of the remaining electrical equipments may remain unchanged. This advantage becomes more important, i.e. provides cost benefits, when the power management system 100 hosts electrical equipments with a lifecycle shorter than of the overall system they are installed in.

Figure 2:
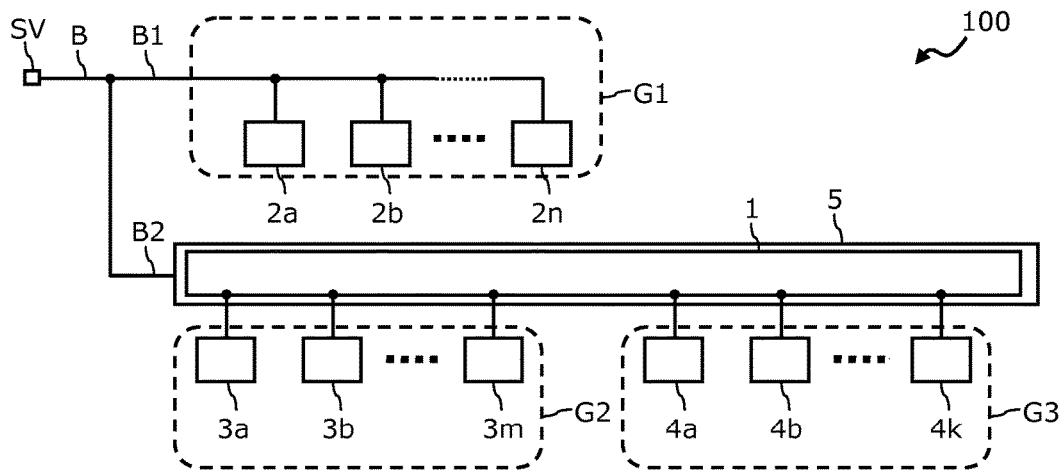
FIG. 2 schematically illustrates the power management architecture of FIG. 1 according to a further embodiment of the invention.

FIG. 2 schematically illustrates a variation of the power management system 100 of FIG. 1. The power management system 100 of FIG. 2 substantially deviates from the power management system 100 of FIG. 1 only in that the functionality of local power management may be integrated into one of the electrical equipments. The specific electrical equipment 5 to be chosen may be an equipment the primary function of which has a criticality level that is close to the criticality of the function power management. The electrical equipment 5 may in particular be one of the tertiary electrical equipments 2a to 2n or one of the secondary electrical equipments 3a to 3m or one of the primary electrical equipments 4a to 4k, depending on the specific power management architecture. Such implementation may be, for example, suitable under space-limited conditions because the need for additional housing and wiring is reduced.

Several applications of the generic power management architectures 100 of FIGS. 1 and 2 are given below with respect to two exemplary application examples. Several criteria may be selected on how to arrange electrical loads in order to reduce the power demand of a space-limited component. All criteria take into account the principle "Mutually Exclusive Activation", i.e. that application of power management is done on purpose during normal operation.

The power management system 100 may for example be implemented in a lavatory or sanitary module of an aircraft or spacecraft. In a lavatory or sanitary module, a group of actuators is usually deactivated and their activation upon demand only a short period in time, for example a few seconds. Those actuators may be chosen as the primary electrical equipments 4a to 4k. The primary electrical equipments 4a to 4k may for example comprise: rinse valves which open to fill a toilet bowl with water after the user has activated the flush switch; flush valves which open to allow the transportation of the waste in the toilet bowl when the pressure difference between the environment and the waste tank is sufficient; waste flaps which open to allow the user to put used paper towels into a dedicated container; and self-closing seats of the toilet. All those actuators are usually activated just once or twice during the utilization cycle of the lavatory by a user, for example a passenger of an aircraft.

On the other hand, there exists a group of actuators the dynamics of which are slower than the dynamics of primary electrical equipments 4a to 4k. These actuators may be chosen as secondary electrical equipments 3a to 3m. For example, the secondary electrical equipments 3a to 3m may include a water heater which is configured to heat up cold water from the main (unheated) water storage to allow the user to wash his hands at a comfortable water temperature. For example, a heat-up phase may last around four minutes under worst case conditions.

Finally, some actuators are usually in a permanently activated state during usage of the lavatory or at least in stand-by mode waiting for input. Those actuators may be chosen not to be included in the local power management and therefore be selected as tertiary electrical equipments 2a to 2n. The tertiary electrical equipments 2a to 2n may include: lavatory lighting which is activated during lavatory usage; a lavatory occupied sign which is activated during lavatory usage; a toilet controller; and a water supply assembly controller which is in stand-by mode most of the time waiting for situational inputs, for example activation of the flush switch, activation of the water flow from the faucet and the like.

Lavatories in an aircraft are subject to relatively long usage periods in comparison to above considered dynamics. For example, after serving meals or in the morning after an overnight flight a lavatory is used by several passengers in a row. Thus, from a power supply view, the lavatory with its functions has to be in "initial" state after the usage by one passenger and before the next passenger enters the lavatory.

With the power management system 100 explained above, the water heater 3a may be deactivated during the activation of the rinse valve 4a, the flush valve 4b or the waste flap 4k, which are each activated for just a few seconds. Although water will then not further be heated, the associated degradation of performance is acceptable since the water temperature will not drop considerably during a few seconds of heating interruption. The individual usage of water by the passenger or the time he is occupying the lavatory both have a significantly larger effect on the water temperature at the end of one usage cycle.

With respect to FIG. 2 it may be possible to include the power management device 1 within a dedicated electrical equipment 5. The dedicated electrical equipment 5 in a lavatory or sanitary module may for example be a water heater, a water supply assembly controller or a toilet controller. The selection may depend on parameters such as the installation constraints or the overall cost assessment. Irrespective of what equipment may be chosen as the dedicated electrical equipment 5, the total power demand of the lavatory module may be reduced, due to the fact that the power demand particularly of flush and rinse valves are relatively high in comparison to the power demand of water heater. By activating only one of those equipments at a time, the maximum power demand may be reduced and the implementation of the power management system 100 in a lavatory decreases, resulting in less system weight and lower requirements for power supplies. Moreover, the power management is centralized and localized within the lavatory or sanitary module, keeping the efforts for development of the equipments low since only the power management device 1—or the dedicated electrical equipment 5 hosting the power management device 1—needs to be developed according to a stringent development process.

As a further example for the implementation of a power management system 100 of FIG. 1 or 2, an aircraft seat is exemplarily illustrated below. The following considerations may be taken into account when designing the power management architecture of an aircraft seat:

Both the seat reading light and multimedia devices should not be subject to power management. They may be activated for longer durations and performance degradation is usually not acceptable for the user.

Seat actuators require full performance when activated, however, they are only temporarily activated for a short period of time. Actuators moving slowly due to reduced electrical power may be accidentally interpreted as faulty behavior by the user.

The power outlet at the seat, for example for supplying electrical power to personal electronic devices of a user can be deactivated for a short durations without significant impact for the user, since usually personal electronic devices are equipped with internal energy storages bridging the temporary loss of external power supply.

Comfort functions such as massage device of a seat or similar are considered to be easily deactivatable when seat actuation is activated. Deactivation of comfort functions may not considered as degraded performance by a user since changing the position of the seat with ongoing massage is not expected to be a normal use case. It may even be considered as advantageous to temporarily deactivate a massage function since seat adjustment is less complicated when all comfort functions are temporarily suspended.

Taking into account above detailed considerations, the tertiary electrical equipments 2a to 2n may be chosen as reading lights and multimedia devices. The secondary electrical equipments 3a to 3m may be selected as the power outlet of the seat and any comfort functions such as a massage device installed in the seat. Finally, the primary electrical equipments 4a to 4k may be selected as comprising one or more seat actuators.

With respect to the variant of FIG. 2, the local power management device 1 may be hosted within one of the seat actuators, in case a separate unit is not desired. The seat actuation systems are advantageous since moving the seat into an initial or upright position is a critical function in an aircraft for the safety of the passengers.

In both cases, the power management is extended by a feedback control function in order to allow comfort functions, for example the massage device, to return into its initial state before the seat actuator is activated and the massage device is deactivated. Upon application of the status signal control, local power management may be hidden even better from the perception of the user, thereby enhancing the passenger experience overall.

Figure 3:
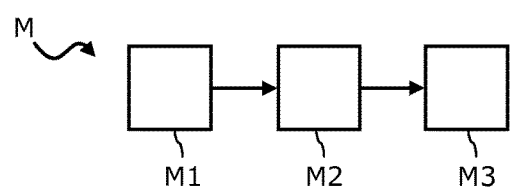
FIG. 3 schematically illustrates a method for managing power supply in an aircraft according to a further embodiment of the invention.

FIG. 3 shows a schematic illustration of a method M for managing power supply in an aircraft, specifically utilizing a power management system as depicted in FIGS. 1 and 2.

The method M comprises at M1 operating the secondary load of the at least one secondary electrical equipment. At M2, the power demand of the primary load of the at least one primary electrical equipment may be monitored. Finally, at M3, the at least one secondary electrical equipment may be deactivated, as long as the power demand of the primary load of the at least one primary electrical equipment exceeds a primary threshold. The primary threshold may in particular be zero, i.e. the secondary electrical equipment may be kept deactivated as long as the primary electrical equipment is active.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

The invention claimed is:

1. A power management system comprising:
an electrical power supply input configured to be coupled to an electrical power supply;
a first power supply bus bar coupled to the power supply input;
a power management device coupled to the first power supply bus bar;
at least one primary electrical equipment including a primary load being coupled to the power management device; and
at least one secondary electrical equipment including a secondary load being coupled to the power manager device,
wherein the power management device is configured to supply electrical power to the at least one secondary electrical equipment, to supply electrical power to the at least one primary electrical equipment, and to deactivate the power supply to the at least one secondary electrical equipment, as long as the at least one primary electrical equipment is supplied with electrical power using a principle of mutually exclusive activation.

2. The power management system according to claim 1, further comprising:
a second power supply bus bar coupled in parallel to the first power supply bus bar to the power supply input;
at least one tertiary electrical equipment including a tertiary load coupled to the second power supply bus bar.

3. The power management system according to claim 1, wherein the power management device is further configured to apply a switching delay, before deactivating the power supply to the at least one secondary electrical equipment and supplying the at least one primary electrical equipment with electrical power.

4. The power management system according to claim 3, wherein the at least one secondary electrical equipment is configured to return a status signal with respect to its operational state to the power management device, and wherein the power management device is configured to set the duration of the switching delay according to the returned status signal.

5. A lavatory of an aircraft, comprising:
a power management system comprising:
an electrical power supply input configured to be coupled to an electrical power supply;
a first power supply bus bar coupled to the power supply input;
a power management device coupled to the first power supply bus bar;
at least one primary electrical equipment including a primary load being coupled to the power management device; and
at least one secondary electrical equipment including a secondary load being coupled to the power manager device,
wherein the power management device is configured to supply electrical power to the at least one secondary electrical equipment, to supply electrical power to the at least one primary electrical equipment, and to deactivate the power supply to the at least one secondary electrical equipment, as long as the at least one primary electrical equipment is supplied with electrical power using a principle of mutually exclusive activation, and
wherein the secondary electrical equipment is a water heater and wherein the primary electrical equipment is one or more of a rinse valve, a flush valve and a waste flap.

6. The lavatory of an aircraft of claim 5, further comprising:
a second power supply bus bar coupled in parallel to the first power supply bus bar to the power supply input;
at least one tertiary electrical equipment including a tertiary load coupled to the second power supply bus bar;
wherein the tertiary electrical equipment is one or more of a lavatory lighting, an occupied sign, a water supply assembly controller and a toilet controller.

7. The lavatory according to claim 5, wherein the power management device is integrated in a water heater or a water supply assembly controller.

8. An aircraft seat, comprising:
a power management system comprising:
an electrical power supply input configured to be coupled to an electrical power supply;
a first power supply bus bar coupled to the power supply input;
a power management device coupled to the first power supply bus bar;
at least one primary electrical equipment including a primary load being coupled in parallel to the power management device; and
at least one secondary electrical equipment including a secondary load being coupled in parallel to the power manager device,
wherein the power management device is configured to supply electrical power to the at least one secondary electrical equipment, to supply electrical power to the at least one primary electrical equipment, and to deactivate the power supply to the at least one secondary electrical equipment, as long as the at least one primary electrical equipment is supplied with electrical power using a principle of mutually exclusive activation,
wherein the secondary electrical equipment is one or more of a power outlet and a comfort device for a passenger, and
wherein the primary electrical equipment is a seat actuator.

9. The aircraft seat of claim 8, further comprising:
a second power supply bus bar coupled in parallel to the first power supply bus bar to the power supply input;
at least one tertiary electrical equipment including a tertiary load coupled to the second power supply bus bar;
wherein the tertiary electrical equipment is one or more of a reading light and a multimedia equipment.

10. The aircraft seat according to claim 8, wherein the power management device is integrated into a seat actuator.

11. A method for managing power supply in an aircraft having a power management system of claim 1, the method comprising:
operating the secondary load of the at least one secondary electrical equipment;
monitoring the power demand of the primary load of the at least one primary electrical equipment; and
deactivating the at least one secondary electrical equipment as long as the at least one primary electrical equipment is supplied with electrical power using a principle of mutually exclusive activation.

* * * * *